United States Patent
Zima et al.

[11] Patent Number: 6,045,444
[45] Date of Patent: Apr. 4, 2000

[54] COMPACT AUTOMOTIVE AIR CONDITIONING MODULE

[75] Inventors: Mark James Zima, Auburn Hills; Brian Scott Ankrapp, Royal Oak, both of Mich.; Wayne Oliver Forrest, Gasport, N.Y.; Richard J. Burnham, Rochester, Mich.

[73] Assignee: General Motors Corporation, Detroit, Mich.

[21] Appl. No.: 09/141,701

[22] Filed: Aug. 28, 1998

[51] Int. Cl.[7] ..................................................... B60H 1/00
[52] U.S. Cl. .............................. 454/121; 165/42; 165/43; 165/103; 454/156
[58] Field of Search ..................................... 454/121, 156, 454/126, 159, 160; 165/42, 43, 103

[56] References Cited

U.S. PATENT DOCUMENTS

| 4,391,465 | 7/1983 | Piano ........................................ 296/208 |
| 4,733,739 | 3/1988 | Lorenz et al. ............................. 180/90 |
| 5,005,898 | 4/1991 | Benedetto et al. ....................... 296/194 |
| 5,154,223 | 10/1992 | Ishimaru et al. ........................... 165/42 |
| 5,162,020 | 11/1992 | Asano et al. .............................. 454/156 |
| 5,326,315 | 7/1994 | Inoue et al. .............................. 454/126 |
| 5,709,601 | 1/1998 | Heck ........................................ 454/121 |
| 5,890,651 | 4/1999 | Kanda ................................. 454/121 X |
| 5,934,361 | 8/1999 | Parisi et al. ............................. 454/121 |

FOREIGN PATENT DOCUMENTS

| 5-141764 | 6/1993 | Japan ..................................... 454/126 |
| 5-296553 | 11/1993 | Japan ..................................... 454/126 |

*Primary Examiner*—Harold Joyce
*Attorney, Agent, or Firm*—Patrick M. Griffin

[57] ABSTRACT

A compact HVAC module housing (30) incorporates a novel temperature valve belt (74) and support frame therefore (60) that fit between an evaporator (56) and heater (58). This allows the entire housing (30) to be very compact, and to be more easily integrated into a vehicle body structural cross beam (32). The temperature valve and its location, as well as a reversed air stream through the heater (58), together allow the mixing area for the cold and not air streams to be well within a minimal space envelope of the housing (30), rather than outside of it.

4 Claims, 13 Drawing Sheets

COMPACT AUTOMOTIVE AIR CONDITIONING MODULE

This invention relates to automotive heating, air conditioning and ventilation modules and housings therefor.

BACKGROUND OF THE INVENTION

Automotive heating, ventilating air conditioning and ventilation modules (generally referred to as just air conditioning modules, or abbreviated to HVAC modules) consist basically of a hollow plastic housing within which are contained heat exchangers and various air flow directing devices. These components, in cooperation, receive, temper, and redirect the flow of forced air from an upstream blower to and through several downstream outlets within the vehicle. Various valves, generally in the form of swinging flapper doors, select the outlets to which the air ultimately exits, and these are generally referred to as mode valves. Air can exit high to the windshield in so called defrost and defog modes, or at various mid height outlets, or to lower, floor directed outlets, or both. The mid height outlets are often called "air conditioning" outlets and the floor outlets "heater" outlets, based on the temperature of the air which is generally thought to be most comfortable at those locations, although air of any temperature can be directed through any outlet.

The temperature of the air that ultimately reaches any outlet is generally determined by a so called reheat and air mix system, using the evaporator and heater in series. A so called temperature valve selects and divides the air flow through hot and/or cold sources and, again, is typically a swinging flapper door. The evaporator is the larger of the two heat exchangers, and extends across the entire width of the housing, so that all the forced air passes through it first, regardless of whether the evaporator is cold and enabled, or switched off. The heater, downstream of the evaporator, is significantly smaller, so that cooled (or, at least, unheated) air that has passed through the evaporator can be selectively passed through, or diverted around the heater.

A typical prior art HVAC module with reheat and air mix is shown in FIG. 1. The housing 10 contains a conventionally sized and located evaporator 12 and heater 14. For better analysis of the workings of the module, the interior of the housing 10 can be conceptually divided up into four quadrants, A, B, C and D, based on the space envelope that is inevitably occupied by the evaporator 12 and heater 14. The larger, upstream evaporator 12 occupies all of both the lower and upper upstream quadrants A and B. The smaller, downstream heater 14 occupies only the lower, downstream quadrant C, while leaving the upper, downstream quadrant D essentially empty. Quadrant D does provide space for the swinging motion of a temperature valve door 16, however, which determines the final air temperature by determining the degree to which air that has passed first through the upstream evaporator 12 is heated.

The degree of heating of the air flow is varied not by varying the temperature of the heater 14, which has a basically constant flow of hot engine coolant through it, but by varying the proportion of air flow over and through it. Temperature door 16, in conjunction with a baffle 18 in front of the downstream face of the heater 14, is moved so as to selectively block all air flow through, or permit all air flow through, or partially permit air flow through, the heater 14. Any air flowing through the heater 14 is then routed up the back face of heater 14 and into a mixing chamber area, generally denoted at E, which is external to the four quadrants just described. Within the mixing chamber E, any air that has passed straight through the evaporator 12 is mixed with any air that has been routed through heater 14 (as determined by the position of temperature door 16), to attain a final intermediate temperature. From the mixing chamber E, tempered air is then routed through whichever outlet or outlets the operator selects, including upper defroster outlet 20, mid level "A/C" outlet 22, or floor directed "heater" outlet 24.

While the basic reheat system just described has worked well for years, smaller cars present a need for more compact modules and housings. Swinging valve doors inevitably need a semi cylindrical volume within which to move, and are also inherently non linear in their response. That is, they tend to behave as either totally open or closed, and do not do well and providing a "partially open" condition. So called "film valves", in which a rolling belt with a central opening provides a precisely sized flow path and improved linearity of air flow, are seeing increased use as a response to the linearity issue.

Examples of film valve systems may be seen in U.S. Pat. Nos. 5,326,315 and 5,154,223. In general, however, such systems still mix the air well downstream of the heater, and well outside of the minimal space envelope that is inevitably occupied by the evaporator and heater. The space between the evaporator and heater is typically empty, and not occupied by any particular structure. In one case, a film belt is located in the space between the evaporator and heater, as seen in U.S. Pat. No. 5,162,020. Even there, however, the mixing zone is located well downstream of the heater, so the use of a film valve per se does not do much to make the overall module more compact, even if it is more precise in the determination of final air temperature.

Another recent design trend has been the attempt to save space by integrating the HVAC module into the structure of the car itself, especially by using the instrument panel, cross car structural beams, or both to provide air flow duct work. For example, in co assigned U.S. Pat. No. 5,709,601, the air ducts and HVAC module are both housed beneath the dashboard assembly. Because of the width of the HVAC module, the entire dashboard assembly is correspondingly quite wide as well. While this has potential for incorporation into larger mini vans and SUVs, it is not potentially as useful in small cars. Earlier patents, such as U.S. Pat. Nos. 4,391, 465; 4,733,739; and 5,005,898 have all proposed similar designs, but have all gone abandoned for non payment of maintenance fees. Clearly, without a more compact design for the HVAC module itself, its integration and incorporation into the vehicle body structure will be limited.

SUMMARY OF THE INVENTION

A compact air conditioning module in accordance with the present invention is characterized by the features specified in claim 1.

The width of the basic housing module disclosed is significantly reduced, with the upper downstream quadrant serving as the final air mixing chamber. This is made possible by the use of a novel film type temperature valve, located in the otherwise unused space between the evaporator and heater, and an air flow diversion passage that routes the heater air flow back and up into the upper downstream quadrant, where it is mixed with any air flow that has passed straight through the evaporator. The reduced width of the module housing allows it to be more easily integrated into a vehicle body cross beam.

In the preferred embodiment disclosed, the evaporator and heater are of basically conventional size and orientation, with the heater running diagonally across the upstream lower quadrant. A first face of the heater is directed generally upwardly and toward the evaporator, while the opposed face is directly downwardly and forwardly. The novel temperature valve includes a film belt located between the evaporator and heater in a basic V shape, with an upstream leg that divides the upstream and downstream quadrant pairs and a downstream leg covers the first face of the heater. A single opening in the film belt can be run back and forth between the two legs of the V so as to selectively block or permit flow through the evaporator and heater in inverse proportion. An air flow diversion passage runs from the lower upstream quadrant to the lower face of the heater, so that any air blocked by the film belt from just passing straight through the evaporator is run in reverse flow through the heater, back and upwardly into the upper downstream quadrant. There, it is mixed with any air that has passed straight through the evaporator to attain a net final temperature. No mixing chamber outside of the basic heat exchanger space envelope is needed, thereby reducing the overall width of the housing module significantly.

In the embodiment disclosed, a film belt mode valve is also used, oriented in an L shape that is opposed to the temperature valve, thereby effectively confining the mixed air within the upper downstream quadrant. Openings in the mode valve belt are also shifted back and forth to selectively direct air from the mixing chamber to the desired outlet. The use of two film belt type valves, located as they are on or within the boundaries of the heat exchanger space envelope, serves to keep the housing module as compact as possible, so that it can be more easily structurally integrated within a cross car structural beam or the like, eliminating the need for additional air flow duct work.

BRIEF DESCRIPTION OF THE DRAWINGS

These and other features of the invention will appear from the following written description, and from the drawings, in which.

DETAILED DESCRIPTION OF THE INVENTION

Figure 2:
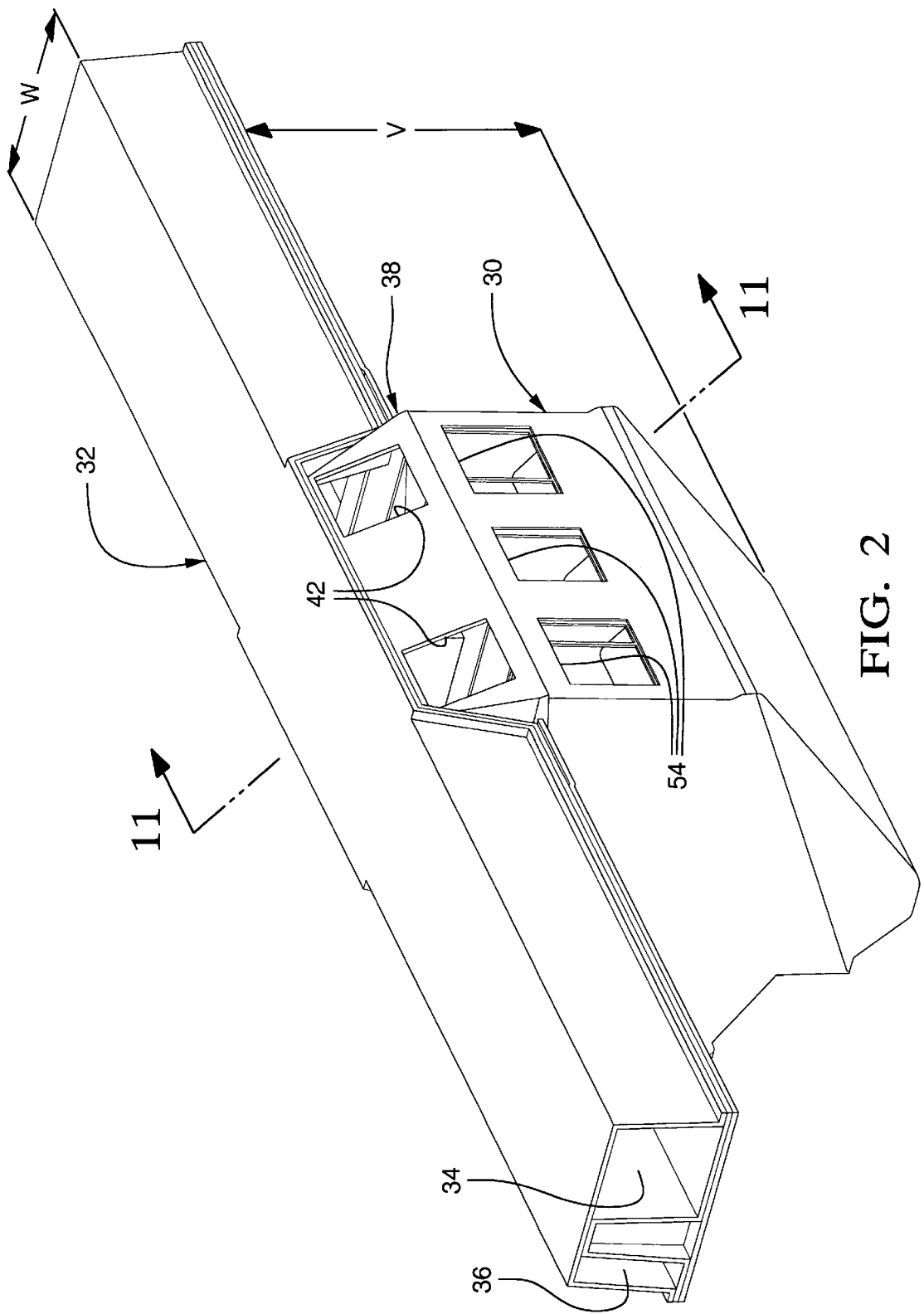
FIG. 2 is a perspective view of the vehicle occupant or rear side of a preferred embodiment of a compact housing made according to the invention, and the cross car beam into which it can be integrated.

Referring first to FIG. 2, a preferred embodiment of an HVAC module housing according to the invention is indicated generally at 30, and shown from the rear or occupant side as it is incorporated in a cross car structural beam, indicated generally at 32. Beam 32 is capable of being formed from non metallic, sheet molded composite or injection molded plastic parts. This is because of a generally W shaped stiffener vibration welded or glued within it that gives it sufficient strength to replace a conventional steel or aluminum beam. The stiffener, coincidentally, divides the interior space of beam 32 into several lengthwise chambers which can conveniently provide air flow ducts for an HVAC system. Here, a wider, rear passage 34 is used to direct air to the sides and into the occupant space, while a narrower, front passage 36 is used to direct air to the sides for side window defrosting. Structural beams like beam 32 have been proposed to support HVAC modules beneath, with the air flow therefrom directed up and into channels within the beam. However, such beams have a limited width W, which makes it impractical to physically incorporate the generally much wider HVAC housings directly into the beam. It is more feasible to simply hang the HVAC modules beneath the beam in the vertical direction V, which is not so limited. The housing 30 made according to the invention is compact and narrow enough to allow at least its upper portion to be directly integrated into the beam 32, as will appear below.

Figure 3:
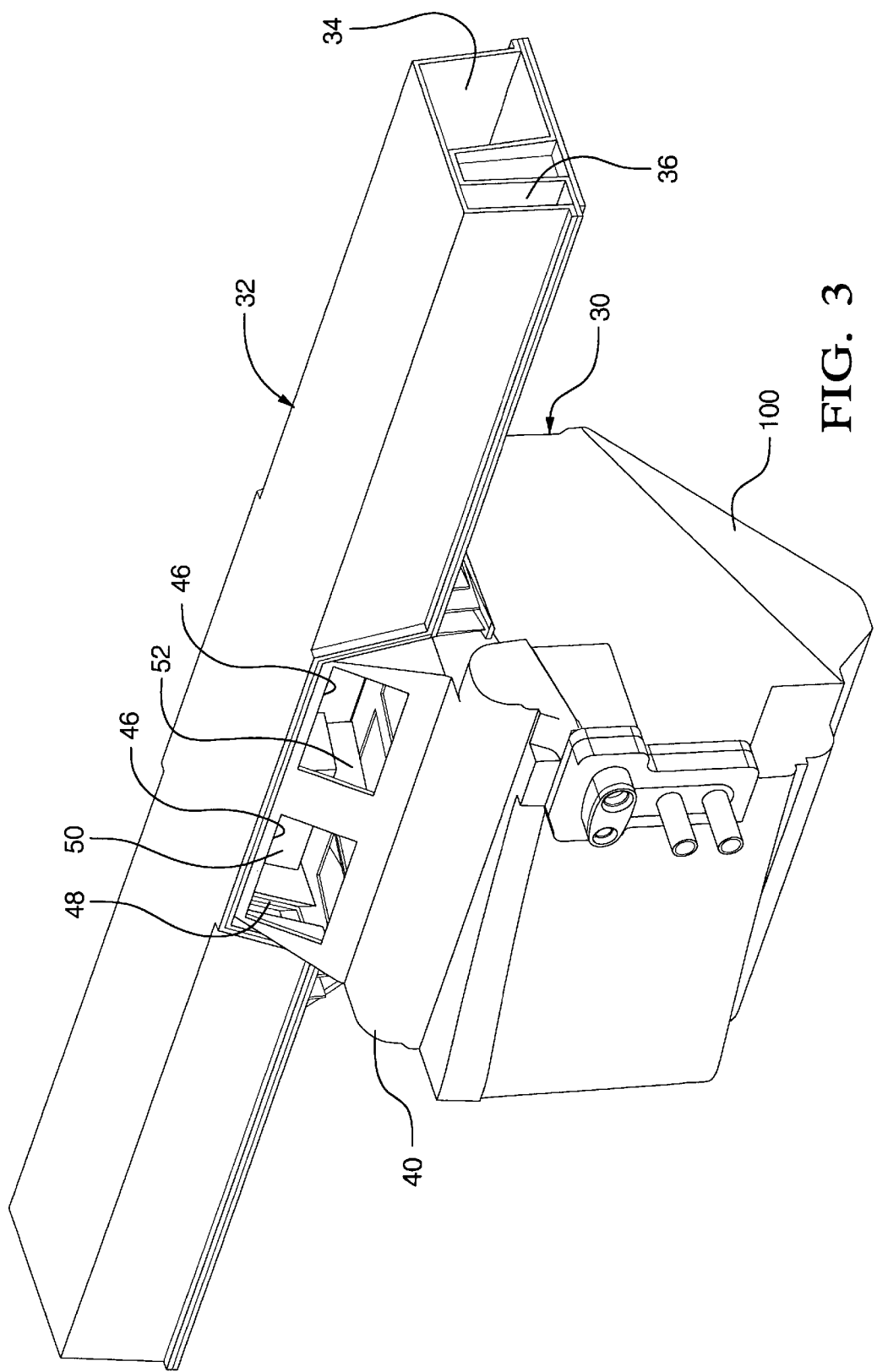
FIG. 3 is perspective view of the opposite or front side of the structure shown in FIG. 2.
Figure 4:
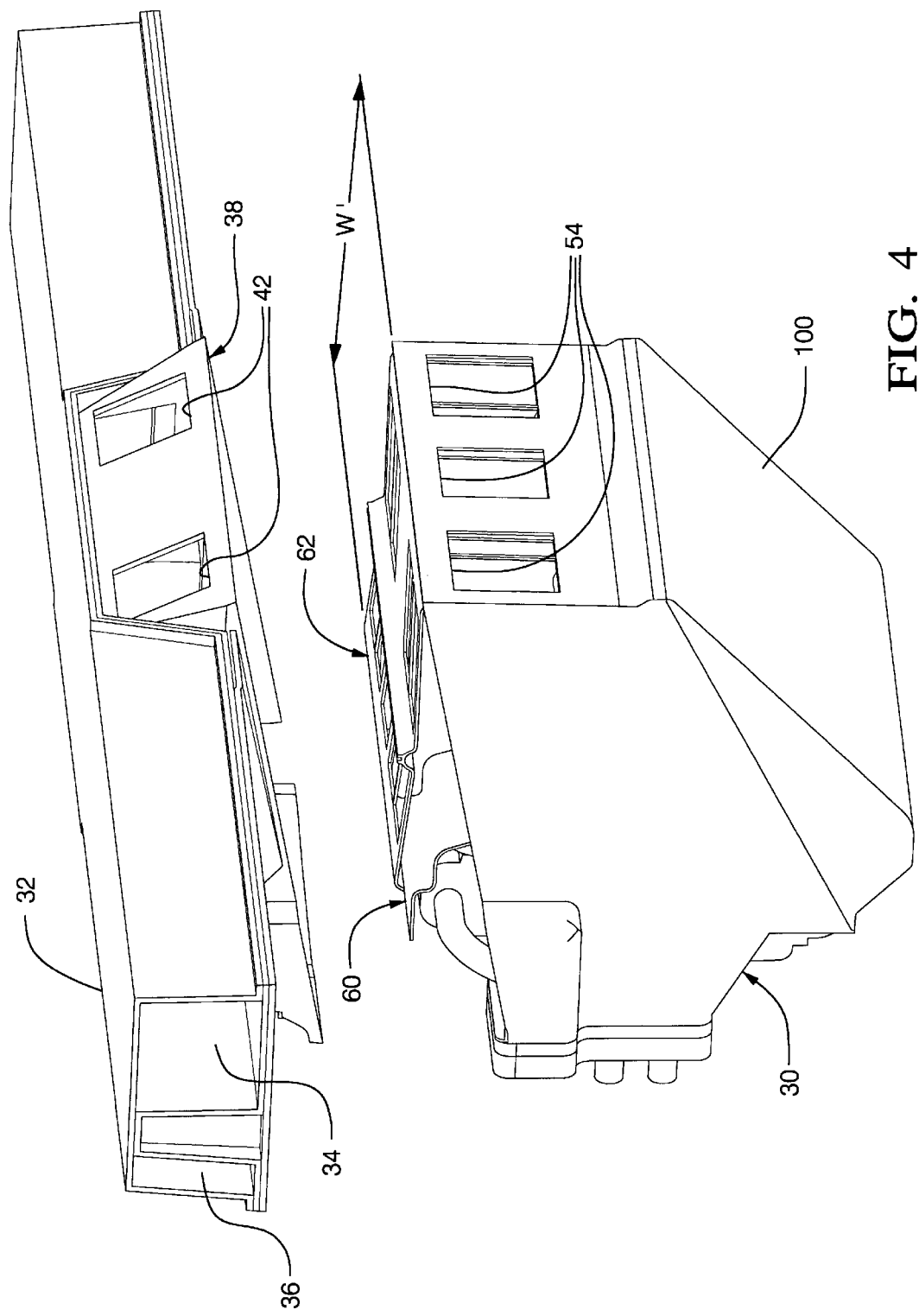
FIG. 4 is a perspective view like FIG. 1, but showing the lower part of the housing disassembled, to reveal internal structure of the housing and of the beam.
Figure 6:
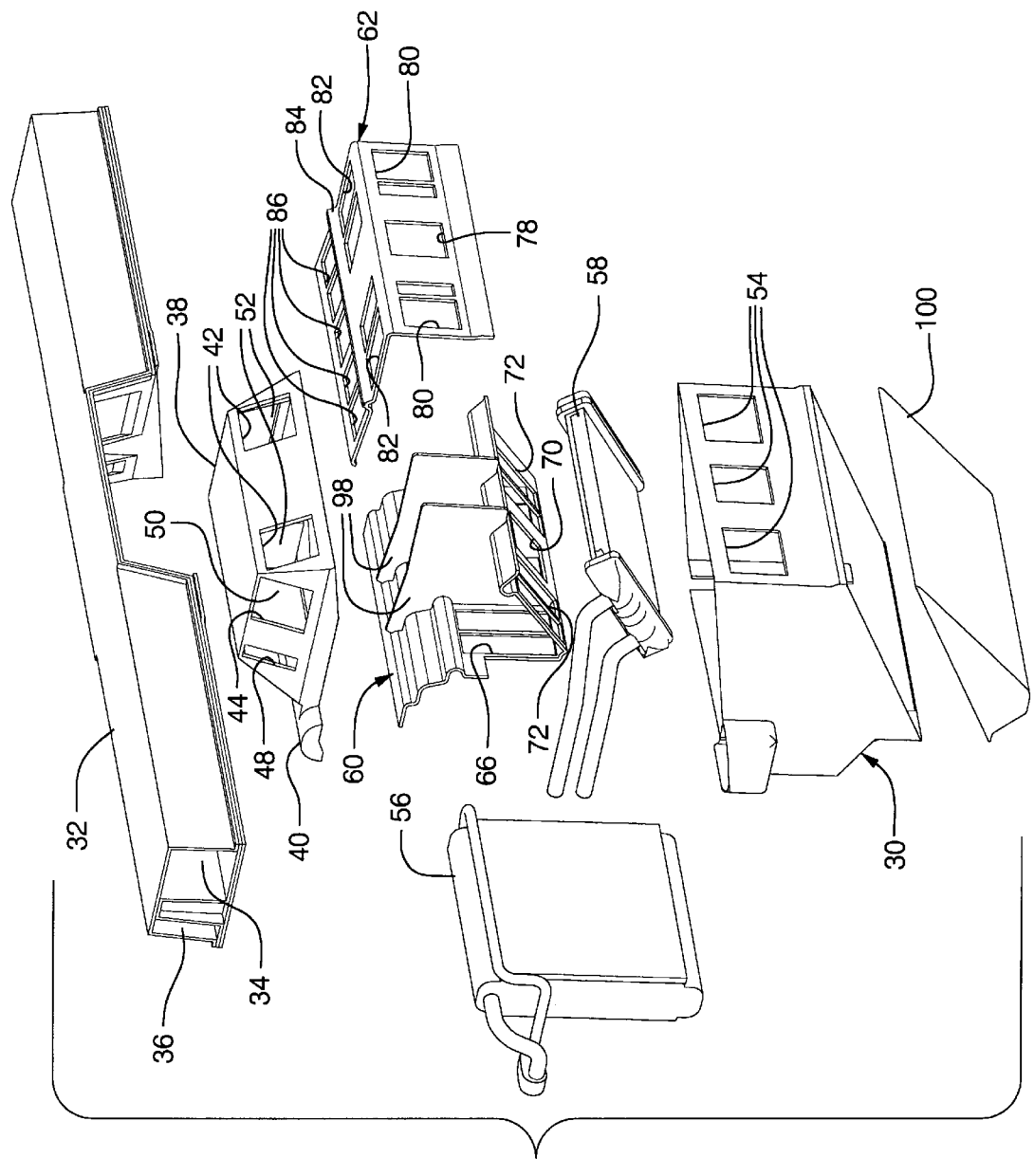
FIG. 6 is an exploded perspective view of the various components included in FIG. 5.

Referring next to FIGS. 3, 4 and 6, housing 30 is shown from the front and rear, removed from beam 32. In general, housing 30 is open at the top, and of a compact width W' close enough to the width of beam 32 to allow part of the beam 32 to close off the top of housing 30, and thereby be successfully integrated into the overall structure. Specifically, incorporated into the center of beam 32 is a top cover 38 formed of the same material as beam 32. Top cover 38 has a front shelf 40 that extends forwardly far enough to cover the top of evaporator 12, but the majority of it has the general shape of a highly truncated pyramid so as to fit closely up into the center of beam 32. There, it is fixed in place by sonic welding, adhesive, or some other secure method to become, in effect, an integral structural part of beam 32. Top cover 38 to contains several outlets and inner divider walls aligned with the beam passages 34 and 36 so as to direct forced air that enters cover 38 from housing 30 into the passages and/or direct it elsewhere into the passenger compartment. At that point, the forced air will have already attained a final mixed temperature within housing 30, as detailed below. Two rear panel outlets 42 face toward the occupant, and two side panel outlets 44 open into each side of the rear beam passage 34. Two front defroster outlets 46 face toward the non illustrated windshield, and two side defroster outlets 48 open into the front beam passage 36. A central, lengthwise divider wall 50 separates the panel outlets 42 and 44 from the defroster outlets 46 and 48. A central, widthwise divider wall 52 segregates each side of the rear beam passage 34, providing a multi zone air flow capability, as detailed below.

Figure 5:
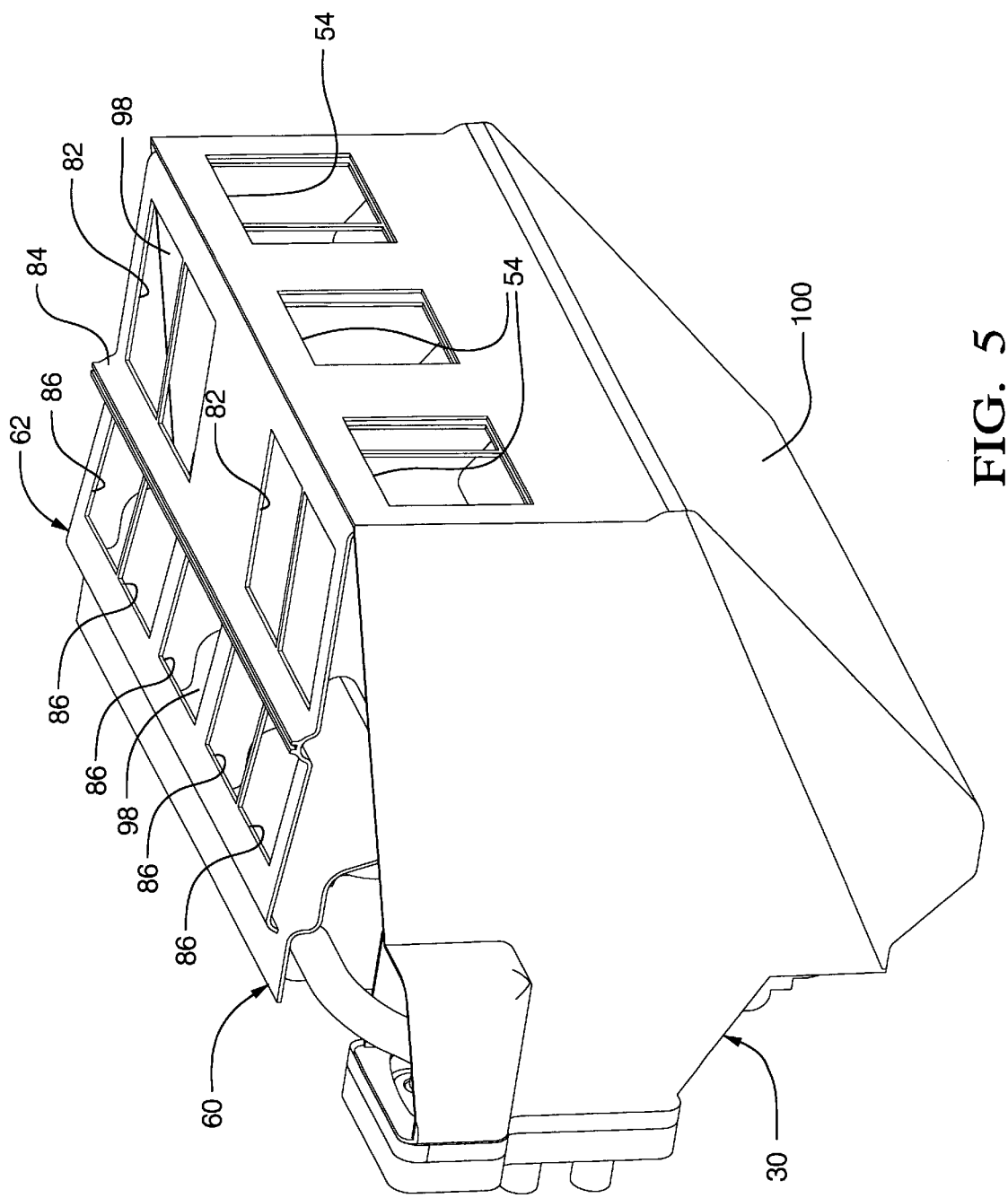
FIG. 5 is a perspective view of just the housing, with the top cover of the housing removed.

Referring next to FIGS. 5 and 6, the housing 30 is basically an open ended, hollow plastic box, molded of the same plastics materials as current HVAC housings. As opposed to the top cover 38, housing 30 is not directly integral to the beam 32, and so need not be stiff enough to be structurally integrated into it. The walls of housing 30 are closed, but for a series of three floor duct outlets 54, which open into other ductwork described below. As noted, the top end of housing 30 is eventually closed by the beam integral top cover 38, while the bottom end is closed by a structure described below, which provides an additional function beyond simple closure. A conventionally sized and located evaporator 56 is large enough to span substantially the entire width and height of the inside of housing 30. A conventionally sized and located heater 58 is spaced downstream from evaporator 56, and is equally wide, but significantly shorter. As disclosed, the heater 58 is slanted slightly away from the evaporator 56, diagonally across the lower downstream quadrant C, with an upper face oriented generally toward the evaporator 56 and an opposed lower face. Seated inside of housing 30, between the two spaced apart heater exchangers 56 and 58, is a generally V shaped temperature belt support frame, indicated generally at 60. Diagonally opposed to frame 60 is a generally L shaped mode belt support frame, indicated generally at 62. Details of the structure and location of the two support frames 60 and 62 are given next.

Figure 7:
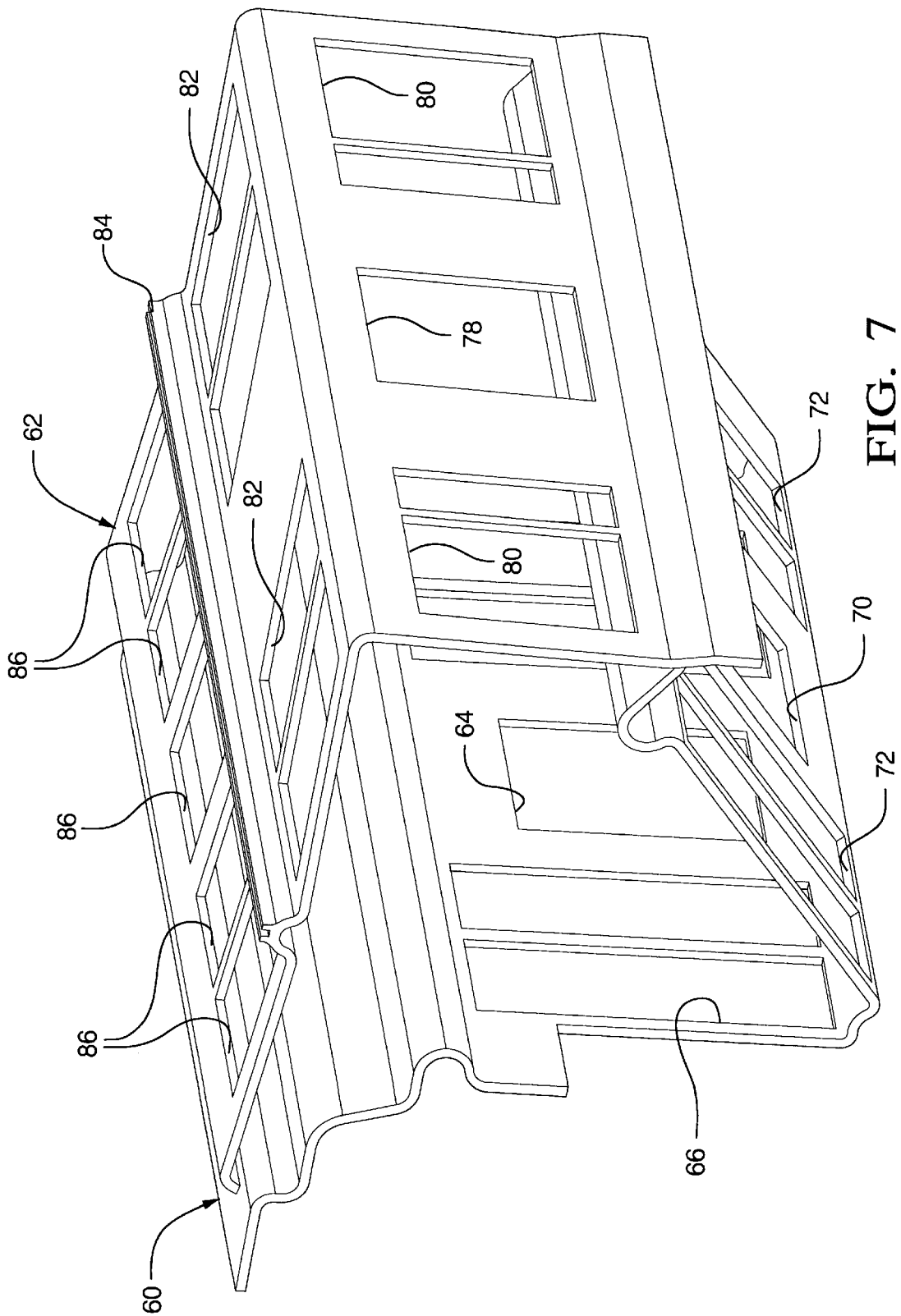
FIG. 7 is a perspective view of the frame supports for the two film belts.
Figure 8:
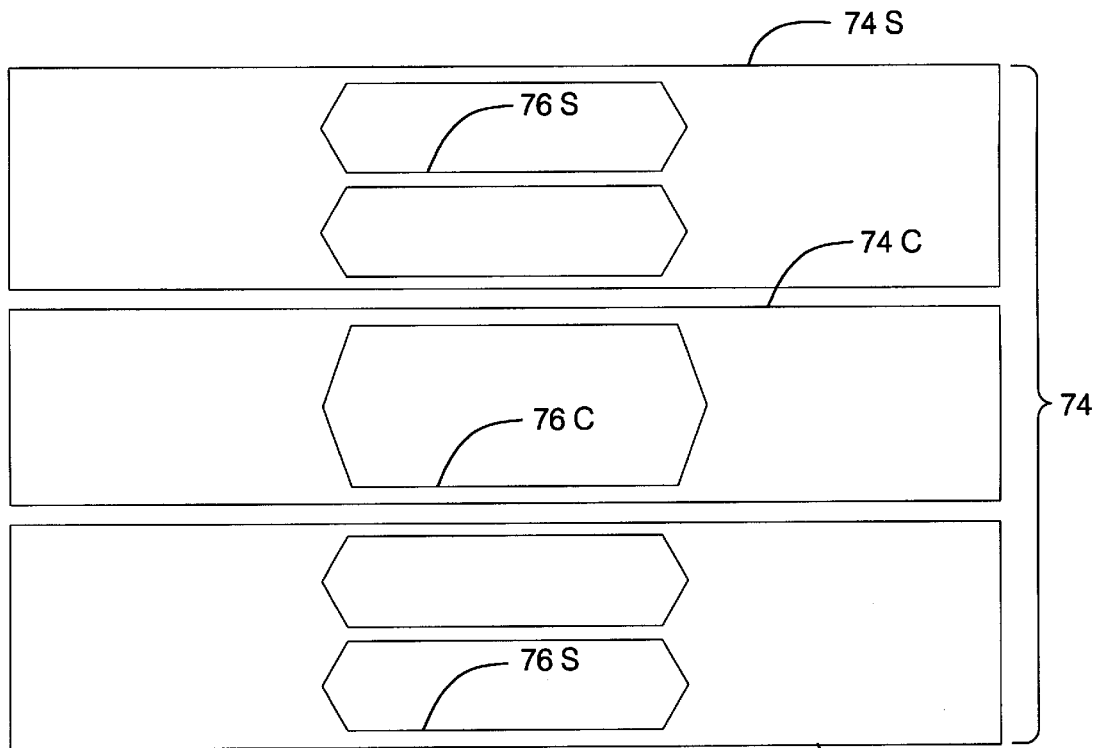
FIG. 8 is a flat view of the temperature valve film belt in a rolled out condition.

Referring next to FIGS. 7 and 8, the temperature belt support frame 60 is a rigid plastic molding with a substantially symmetrical V shape and an included angle of approximately forty five degrees. In the upstream leg of the V, a center cold air window 64 is flanked by a pair of same sized, centrally ribbed side cold air windows 66. In the downstream leg of the V, a central hot air window 70 is flanked by a pair of same sized, centrally ribbed side hot air windows 72. A temperature valve film belt generally and collectively indicated at 74 is adapted to be mounted to frame 60, and is comprised of three narrower and separate belts, including a central belt 74c flanked by two side belts 74s. The central belt 74c has a central opening 76c, substantially matched in size to the support frame central windows 64 and 70. Each side belt 74s has a centrally located opening 76s, substantially matched in size to the support frame side windows 66 and 72.

Figure 9:
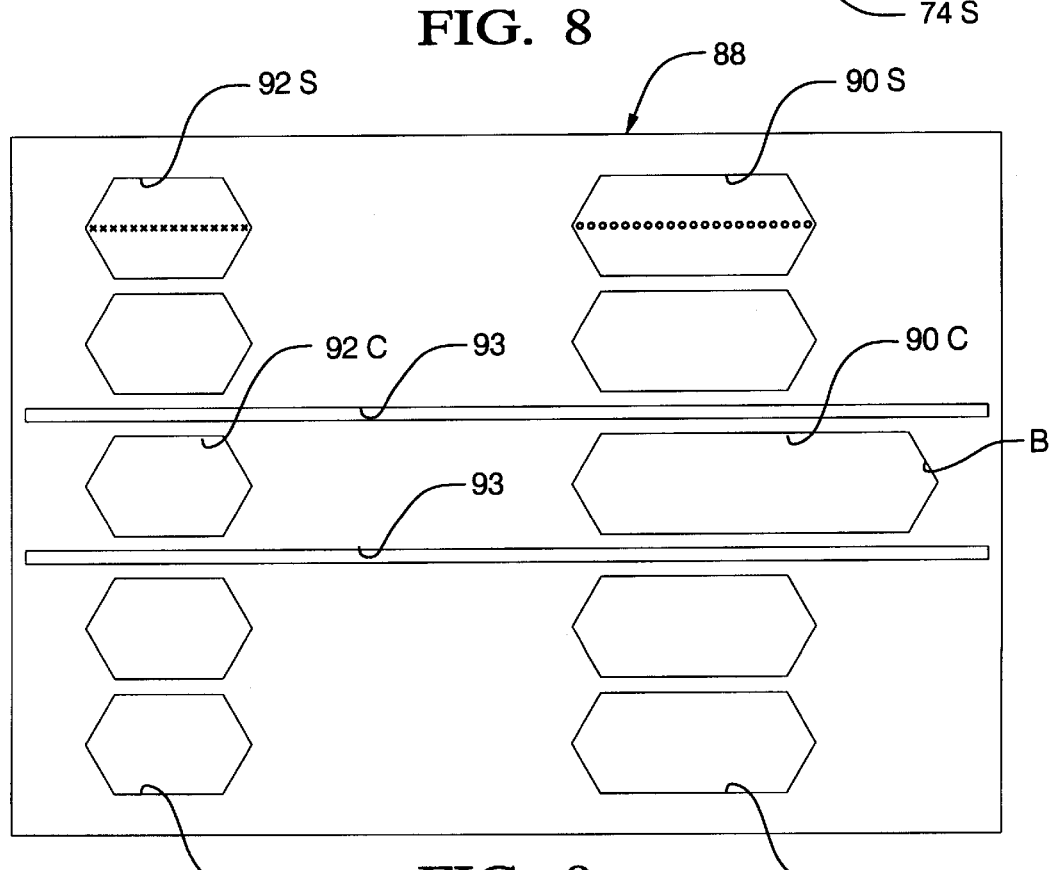
FIG. 9 is a flat view of the mode valve film belt in a rolled out condition.

Referring next to FIGS. 7 and 9, the mode belt support frame 62 is also rigid plastic molding, but with a general L shape having a ninety degree included angle. In the vertical leg, a central window 78 is flanked by a pair of identical side windows 80. In the horizontal, upper leg, a pair of identical ribbed panel outlet windows 82 is separated by a lengthwise rib 84 from a line of five similarly sized defroster windows 86. The central area between the panel outlet windows 82 is solid. A mode valve film belt 88 adapted to be mounted to frame 62 is a single belt with a first central opening 90c. The first central opening 90c is flanked by a pair of slightly shorter first side openings 90s. Mode belt 88 also has a second set of similarly sized openings 92c and 92s that are axially spaced from the first set of belt openings 90. The mode belt 88 is a single belt, but is cut by a pair of parallel clearance notches 93.

Figure 10:
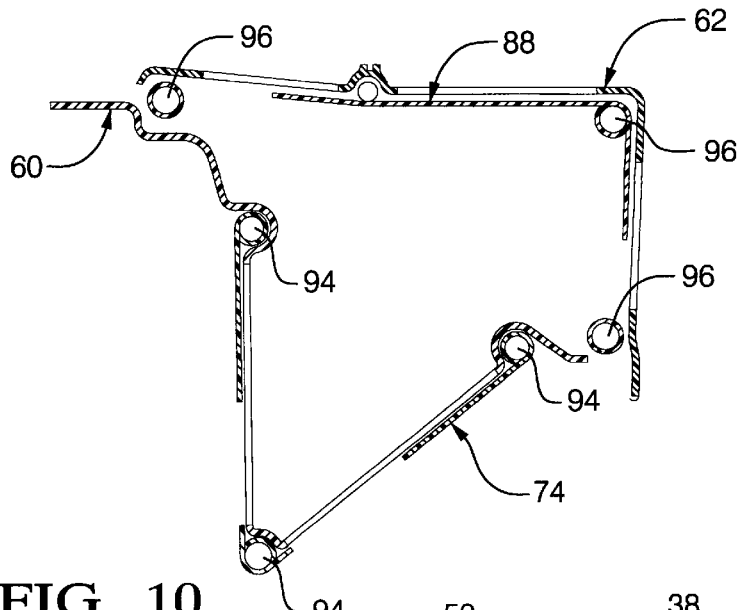
FIG. 10 is a side cross sectional view of the two film belts and their supporting frames.
Figure 11:
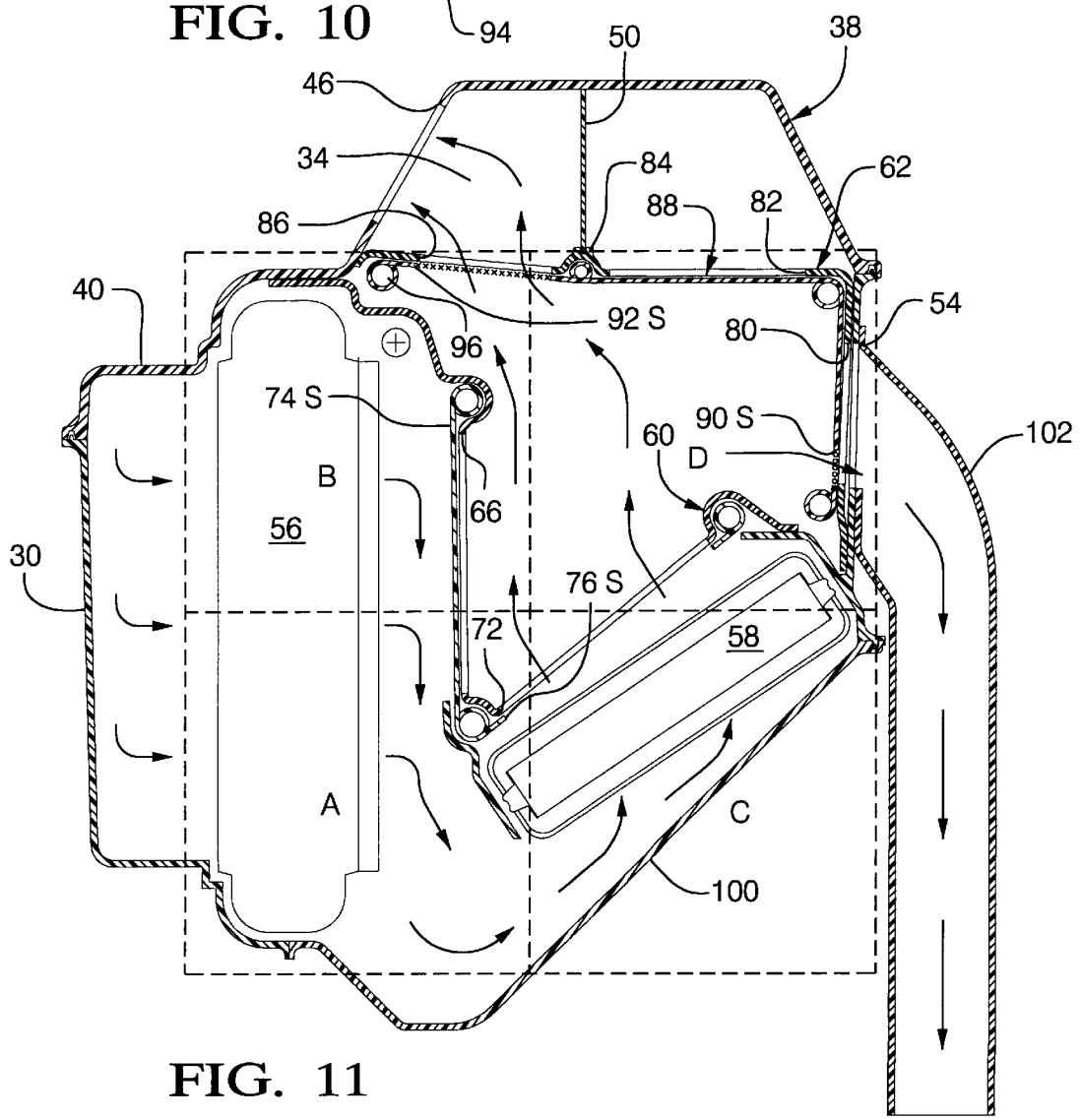
FIG. 11 is a view taken along the line 11—11 of FIG. 12, showing the so called defrost mode, in which fully hot air is directed primarily to the defrost outlets, and slightly into the floor directed outlets as well.

Referring next to FIGS. 10 and 11, and back to FIG. 6, the temperature film belts 74c and 74s are mounted to the outside of their support frame 60 by rollers 94, with the side belts 74s on the outboard sides of the frame 60, and the center temperature belt 74c between. The belts 74c and 74s are capable of being rolled back and forth, singly or in unison, so as to register the various belt openings with their respective aligned frame windows just in the upstream leg of the V, or just the downstream leg, or some inverse proportion of each (⅓–⅔), as is described in more detail below. Likewise, the mode film belt 88 is mounted to the inside of its support frame 62 by three rollers 96, with the openings 90s and 92s located at the outboard sides of the frame 62 and with the central openings 90c and 92c between. The two frames 60 and 62 are basically diagonally opposed, as best seen in FIG. 10. As best seen in FIG. 6, a parallel pair of so called splitter walls 98 are closely captured between them, aligned with the mode belt clearance slots 93, to allow unhindered belt motion. These provide the potential for selective delivery of individually tempered air to the driver side, passenger side, or straight out into the occupant compartment. The splitter walls 98 do not affect the basic compactness of the invention, however, as they are contained within otherwise empty space.

Referring next to FIGS. 2, 3 and 11, the assembly of the various components described above is described. Evaporator 56 and heater 58 fit within housing 30 in a conventional orientation. The temperature belt support frame 60, with its belts 74, is seated in the space between the evaporator 56 and heater 58, with its upstream leg parallel to the upstream face of the evaporator 56 and with its downstream leg parallel to and covering the upper face of the heater 58. The support frame 62 for the mode valve belt 88 is seated within the housing 30 diagonally opposed to the temperature belt support frame 60, generally forming a four sided enclosure therewith. The central and side windows 78 and 80 are registered with the three floor duct outlets 54 of housing 30. Housing 30 with its various internal components is joined and sealed to the underside of the top cover 38 by any secure method, either permanent fixing such as adhesive, or, more conveniently, by removable fasteners. As this is done, the lengthwise divider wall 50 within top cover 38 seats within the rib 84, and the top of the evaporator is covered by the front shelf 40. Divider wall 50 segregates the outlets 42 and 44 in cover 38 from the outlets 46 and 48. In addition, in the embodiment disclosed, the two side panel outlets 44 are segregated from one another by the perpendicular, widthwise divider wall 52. The defroster windows 86 on the other side of the lengthwise divider wall 50 open only to the various defroster outlets 46 and 48. The underside of housing 30 is closed by a bottom cover 100, which is spaced from the lower face of heater 58. Completing the assembly, a series of three floor directed ducts 102 are fitted to the housing floor duct outlets. The centermost of these, preferably, would be run under the front seat and into the back seat passenger space.

Figure 1:
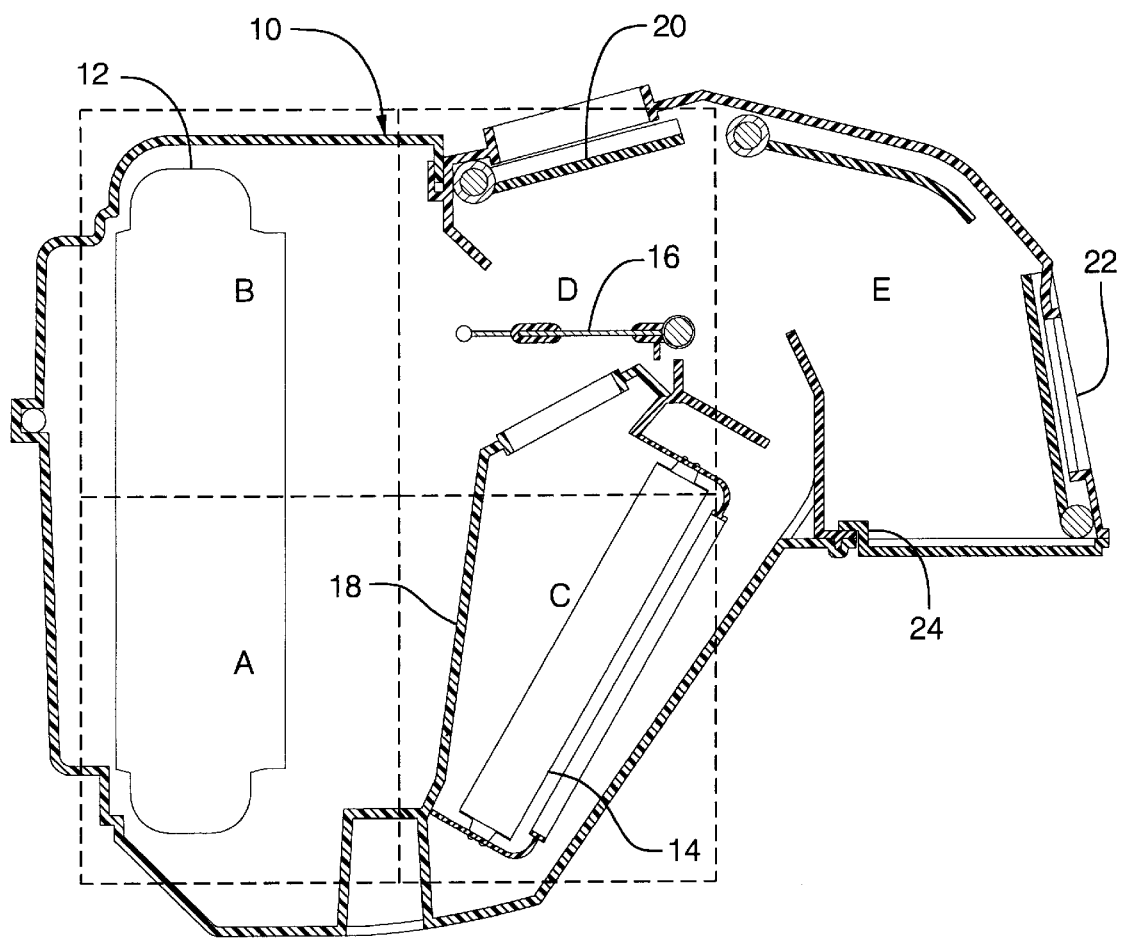
FIG. 1 is a cross section through a prior art module and housing.

Referring next to FIGS. 2 and 11, and back to FIG. 1, the basic construction and internal component orientation of the invention can be compared to the prior art module design described above. The two evaporators 12–56 and two heaters 14–58 have an essentially equivalent size and orientation within the two housings 10–30. Consequently, the interior of housing 30 may also be conceptually divided up into the same four quadrants A–D, defining the space envelope that is inevitably occupied by the two heat exchangers 56 and 58. The temperature valve support frame 60 basically divides the lower upstream quadrant C from the two upstream quadrants A and B, and is located in space unoccupied in the FIG. 1 design. The mode valve support frame 62 lies on the upper boundary of the upper downstream quadrant D, without extending outside of it. Therefore, housing 30, by contrast to conventional housing 10, does not extend widthwise appreciably outside of the basic, minimally required space envelope occupied by the heat exchangers, although bottom cover 100 does extend lower in the vertical direction. Because housing 30 is more compact in the widthwise direction, its top can be closed by a top cover 38, the majority of which can be fitted up and into the relatively narrow beam 32. The internal components within housing 30, oriented as the are, cooperate with the internal structure of the beam 32 into which the top cover 38 in integrated to provide various airflow modes and temperatures described in detail next.

Referring next to FIGS. 11 through 15, the relative location of the internal components and the resulting air flow (shown by arrows) is illustrated for various modes and temperatures. In general, a mode can be considered primarily a function of selected air outlet position, be it windshield directed (defrost and defog), floor directed (heater) or midlevel, panel outlet directed ("a/c"). Air outlet position, in turn, is a function of the position of mode belt 88, which can be deliberately selected by a vehicle occupant, typically the driver. Secondarily, mode involves a selection of whether the evaporator 56 is activated or not (the heater 58 being always hot). The evaporator 56 activation will preferably be an automatic default of the mode selection, however, not an independent choice as such. Moving through FIGS. 11 and 15, the mode belt 88 is being progressively rolled "up" or to the left, with the modes scrolling through defrost, defog, "heater", bi level and "air conditioning." The modes "heater" and "air conditioning" are really terms of art in so far as the temperature of air that is selected may in fact be wide ranging, and not just very hot for "heater" or very cold for "air conditioning". The temperature of air for any mode is chosen independently on the basis of the position of the temperature belts 74s and 74c. Component position and air flow for each mode is described in detail below.

Referring next to FIGS. 2 and 11, the defrost mode is illustrated. With the choice of defrost mode, the mode belt 88 is rolled to the position where the second set of mode belt openings 92c and 92s are completely aligned with the support frame defrost windows 86, and the panel outlet windows 82 are completely blocked by solid portions of the mode belt 88. In addition, the support frame windows 78 and 80 and partially aligned with the mode belt first set of openings 90c and 90s respectively. The control system would also logically be configured, for defrost mode, so as to move all of the temperature belts 74s and 74c in unison to the same position, which, as illustrated, is a "full hot" position that completely aligns the temperature belt openings 76c and 76s with their respective support frame hot air windows 70 and 72. Only the side openings 76s and side hot air window 72 show in the particular cross section at the point where it is taken, however. Conversely, the cold air windows 64 and 66 are entirely closed and blocked by the solid downstream leg of the temperature film belts 74s and 74c, so that the exit face of the evaporator heater 56 is blocked. All entry air first passes through the evaporator 56, which is activated, so as to assure that the entry air is dehumidified before being reheated. Because the cold air windows 64 and 66 are blocked, all air that has passed the evaporator 56 is forced down out of the bottom of quadrant A, into the diversion passage formed by the bottom cover 100, and back up into quadrant D. In effect, the air flows in reverse through the heater 58. There is no cold air to "mix" with the dried, heated air in quadrant D, so it remains hot and flows mostly up through the defrost windows 86 and ultimately into the top cover 38. From there, hot air flows out through the front defrost outlets 46, where it acts on the windshield, and through the side defrost outlets 48 and in both directions to the sides, through the narrower, front beam passage 36, to side glass surfaces. A small fraction of the hot air in quadrant D "bleeds" through the slightly open windows 78 and 80, through the floor duct outlets 54 and into the floor ducts 102.

Figure 12:
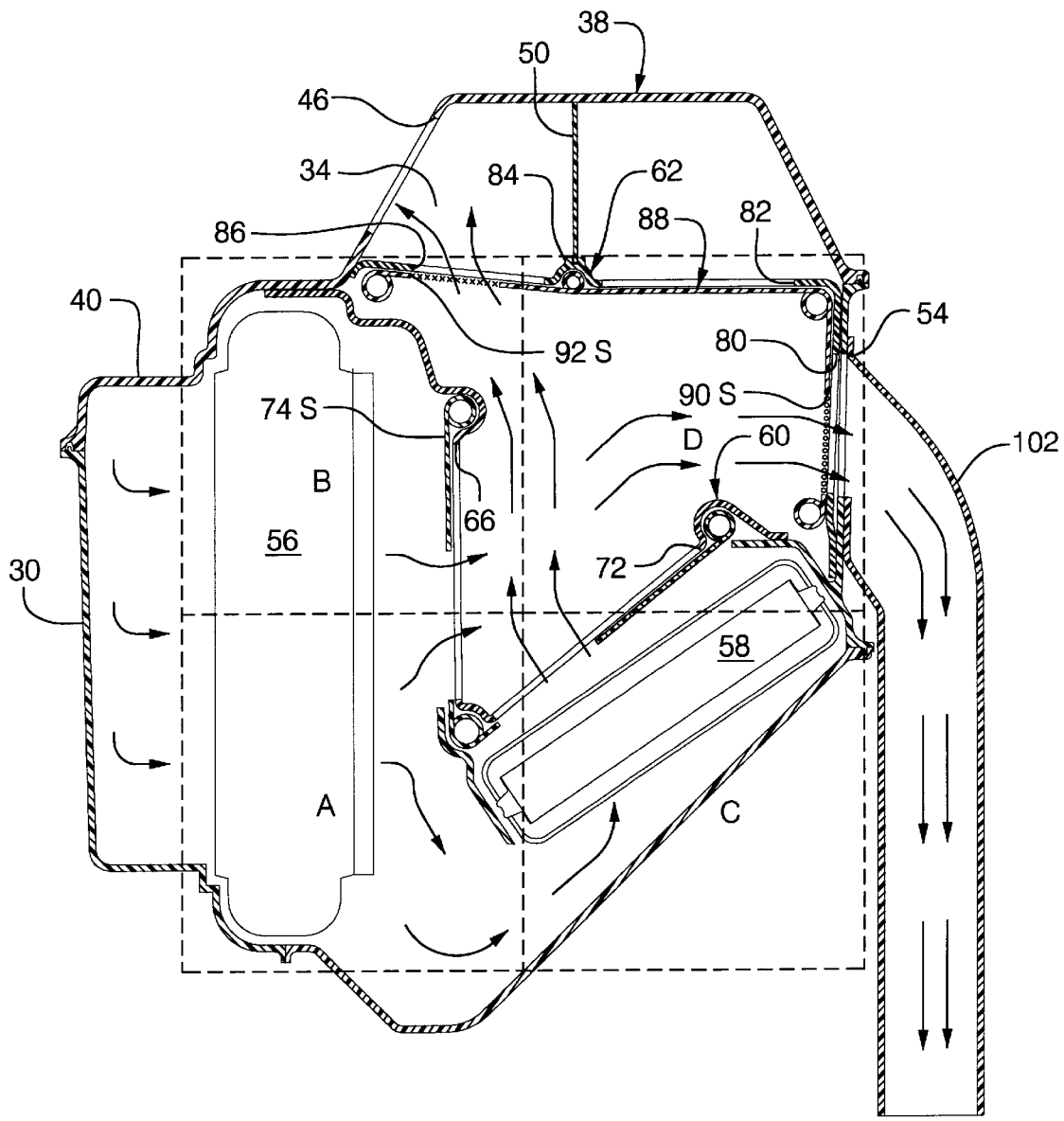
FIG. 12 is a view like FIG. 11, but showing the so called defog mode, with mid temperature air directed slightly to the defrost outlets, but mostly to the floor outlets.

Referring next to FIGS. 2 and 12, the "defog" mode can be more briefly described, with the FIG. 11 "defrost" mode just described serving as an initial starting point. Most significant, as compared to the FIG. 11 position, is that the mode belt 88 has been rolled "up" slightly, or to the left. The shifting of belt 88 to the FIG. 12 position puts less of the second set of openings 92 in registry with the defrost windows 86, and more of the first set of openings 90 in registry with the windows 78 and 80. Consequently, as compared to pure defrost, more air flows out through the floor duct outlets 54 and into the floor ducts 102. The temperature belts 74c and 74s have been rolled up so as to register their belt openings 76c and 76s about half and half with their support frame cold air windows 64, 66 and the hot air windows 70, 72. This allows for about half diverted and reheated air flow up and through heater 58 as just described, and about half straight through air flow through the evaporator 56, which would still be activated for dehumidification. As with other modes, any temperature, that is, any position of the temperature belts 74s and 74c could be chosen, but the split flow shown better illustrates the temperature mixing. The two split air flows reconvene and are mixed in quadrant D. It should be noted that each of the split air flows has started up into quadrant D from a significantly low location, around the bottom of the V, in effect, and so has ample space and time within which to mix. Also, the slanted orientation of the heater 58, coupled with the reverse flow of air through it, forces the heated air stream slightly back and into the cold air stream through the evaporator 56, aiding in the mixing process.

Figure 13:
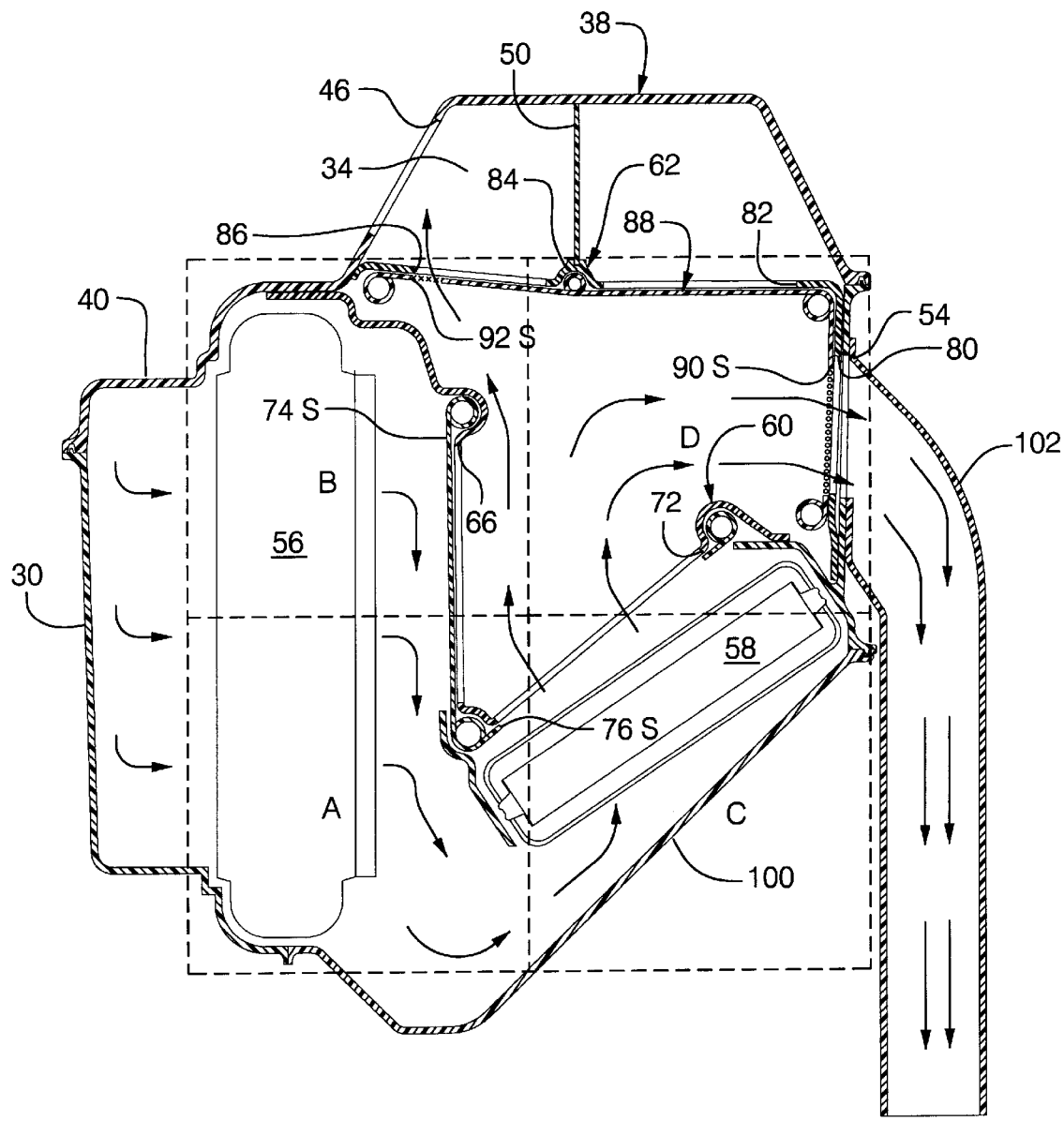
FIG. 13 is a view like FIG. 12, but showing the full heater mode, with full hot air directed essentially all to the floor outlets, with only a so called "heater bleed" being directed to the defrost outlets.

Referring next to FIG. 13, the heater mode has been selected, and with full hot air. The control system would now preferably deactivate the evaporator 56. The mode belt 88 has been rolled up progressively farther from the FIG. 12 position, so as to put only a very little of the second set of openings 92 in registry with the defrost widows 86, and so as to put the first set of openings 90 fully in registry with the windows 78 and 80. Only the side heater window 80 shows in that particular cross section, however. As opposed to defrost and defog air, where only hot (or at least, "reheated") air would be a logical choice, there is the capability, in the embodiment disclosed, for different vehicle occupants to select different temperatures for the air flow that is ultimately exiting the floor ducts 102, or the panel outlets 42 and 44, or both. This capability is provided by the separation of the temperature belt 74 into the three independently movable belts 74c and 74s, working in conjunction with the splitter walls 98 and the widthwise divider wall 52. If an occupant specific temperature selection were not needed, then the belts 74s and 74c would simply be consolidated into one belt 74, with the same exact openings 76c and 76s, and the splitter walls 98 and widthwise divider wall 52 left out. FIG. 13 illustrates the situation where at least the passenger side occupant has chosen full hot air. The vehicle control system would preferably shut off the compressor and evaporator 56, as indicated above, and would also roll the passenger's side temperature belt 74s to the position shown, where the opening 76s is fully registered only with the side hot air window 72, and is completely blocking the side cold air window 66. Air passing through the deactivated evaporator 56 remains at ambient temperature, and is all diverted down through the bottom cover 100 and up through the heater core 58, where it is heated, and where it is blocked from flowing to the side by the splitter window 98. Again, while there is no "cold" air to mix, as shown, the temperature belt 74s could be positioned so as to allow some ambient temperature air to pass straight through the evaporator 56 and mix with the heated air. Mixed or not, the hot air then flows mostly through the open side heater window 80, through the aligned floor duct outlet 54, and down through the floor directed duct 102. It should be kept in mind that, given the fact that there is a single mode belt, air will also be flowing through the central window 78 and through the other side heater window 80 on the driver side, but with a temperature determined by the position of the other temperature belts 74c and 74s. A small proportion of air "bleeds" through the defrost window 86, as well, so as to assure some windshield defogging always exists on a default basis.

Figure 14:
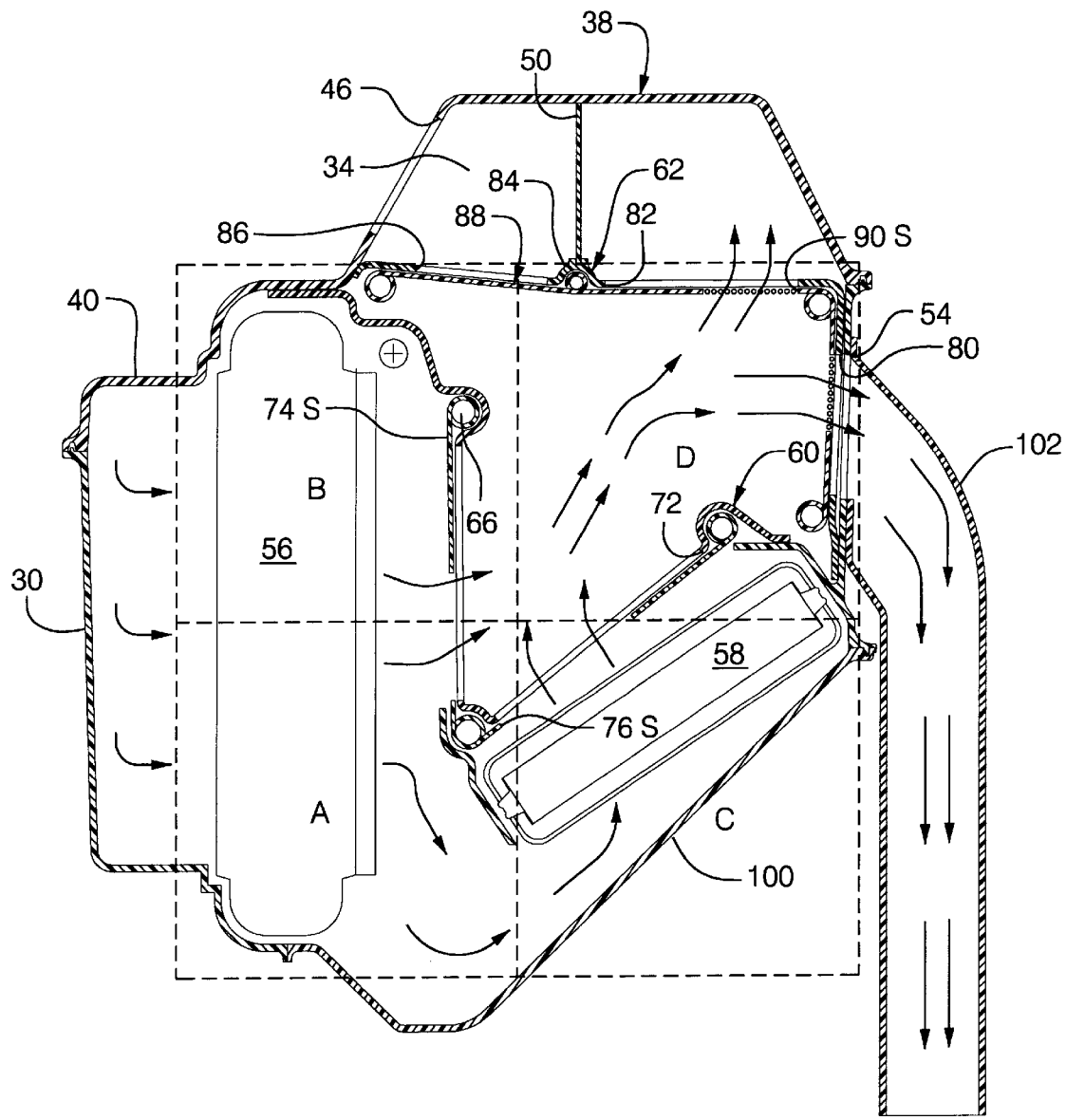
FIG. 14 is a view showing the so called bi level mode, with mid temperature air directed partially to the mid level outlets and partially to the floor outlets.

Referring next to FIG. 14, the mode belt 88 has been rolled up even farther from the FIG. 13 position so as to split the openings approximately 50-50 between the panel outlet windows 82 and the windows 78 and 80, the so called "bi-level" mode. The terminology refers to the split in outlet level for the exiting air. The vehicle control system would preferably automatically reactivate the evaporator 56 in bi level mode, but the temperature of the air ultimately provided would depend on the extent to which air passing through the evaporator 56 is diverted up and through the always hot heater 58 for reheat, or not. Here, the passenger side occupant (at least) has selected a temperature setting that puts at least the passenger's side temperature belt 74s in the position shown, so as to divert about half of the air flow down and up through the heater 58. Uniquely to the bi-level mode, thorough mixing of the air streams is not needed or desired, with the hot air stream flowing up through the heater 58 flowing preferentially through the floor duct outlet 54 and floor duct 102 on the passenger side, and with the air stream passing directly through the evaporator 56 flowing preferentially through the panel outlets 42 and 44 (at least those panel outlets 42 and 44 on the passenger side, since those on the driver side may receive a different temperature air). Some air does mix, of course. This stratification of air flow is intended for a cool but sunny day, where cooler air to the head and chest area of an occupant is desired, but warmer air to the feet. The particular slanted, low orientation of the heater 58 disclosed aids in that air temperature split or stratification.

Figure 15:
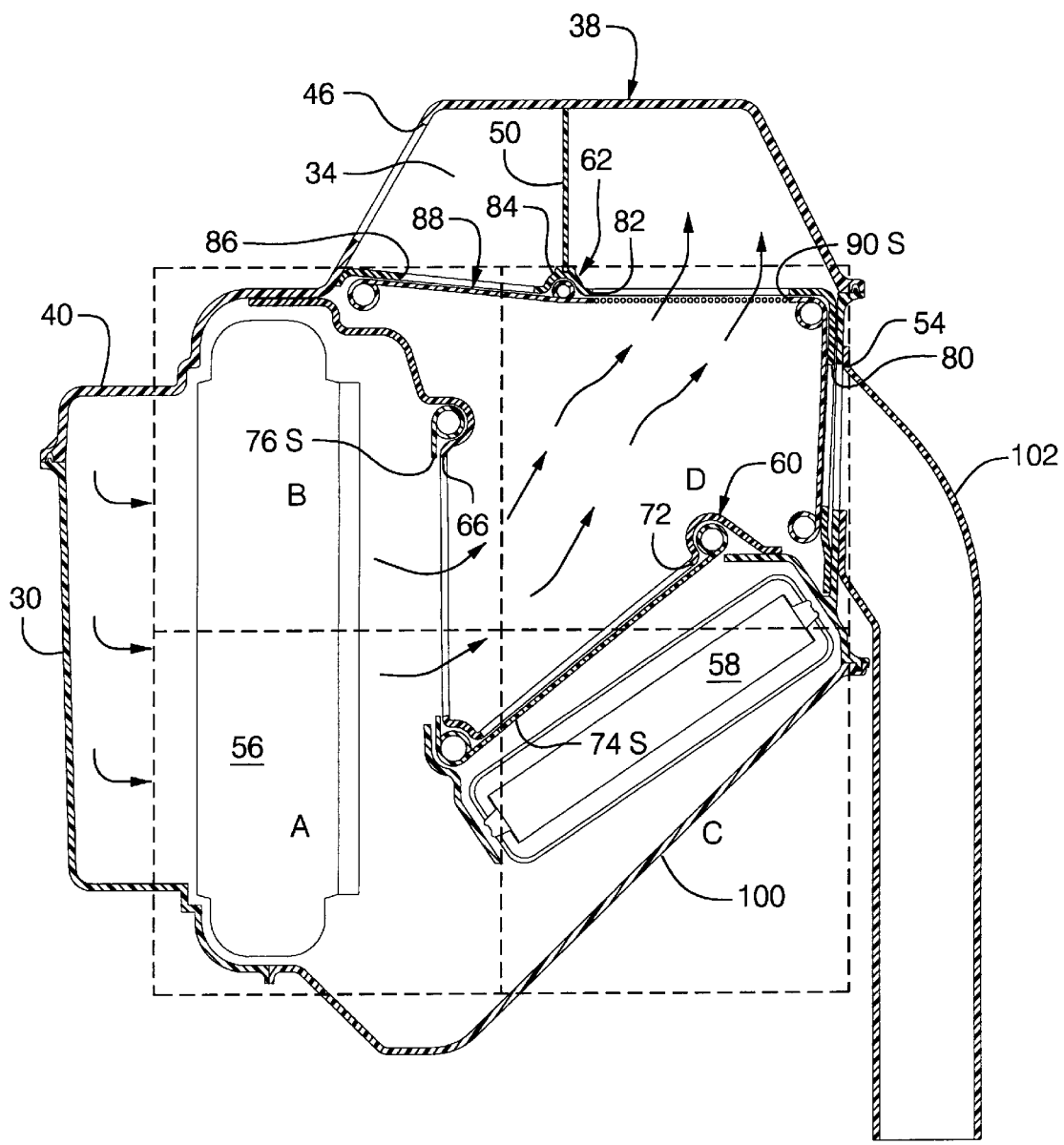
FIG. 15 is a view like FIG. 14, but with fully cold air now being directed just to the panel outlets.

Referring next to FIG. 15, the relative location of the internal components is illustrated for the so called cold air or "a/c" mode. The control system of the vehicle would provide, of course, that the compressor and evaporator 56 be activated. The mode belt 88 has been rolled even farther up, from the FIG. 14 position, to the position where its first set of openings 90 are all completely registered with the its support frame panel outlet windows 82. The second set of openings 92 are now completely rolled up on the uppermost roller 96. The other mode belt support frame windows 80 and 86 are completely blocked off by solid portions of the mode belt 88. Here, full cold temperature is shown, and given that temperature selection, at least the passenger temperature side belt 74s is rolled up so as to completely align the side belt opening 76s with the support frame cold air window 66. Conversely, since the cold air window 66 is entirely open, the opposed hot air window 72 is entirely closed by the downstream leg of the temperature film belt 74s, so that the upper face of the heater 58 is blocked. All air cooled by the evaporator 56, in turn, passes straight through the passenger side cold air windows 66 and the aligned temperature belt side opening 76s. No air is able to pass through the heater 58, since its upper face is blocked. The cold air passing through the passenger side belt opening 76s is also confined and prevented from blowing over to the other, driver's panel outlet window 82 by the adjacent splitter wall 98. It should be kept in mind that all the belts 74 could be simultaneously moved to the same position. Cold air passing the temperature belt(s) 74 is forced through and up into the fourth quadrant D, but there is no diverted hot air with which to mix. Instead, the fully cold air passes through the panel outlet window 82 on the passenger side, and up into the top cover 38, and effectively into the interior of the beam 32. At that point, the cold air is blocked from flowing toward the driver side by the interposed widthwise divider wall 52, and is blocked from flowing forward to the defroster outlets 46 and 48 by the lengthwise divider wall 50. Consequently, from inside the top cover 38, cold air can pass only through the passenger's side panel outlet 44 (and from there, in one direction through the beam rear passage 34) and through the passenger's rear panel outlet 42. In addition, in the "a/c" mode, the longer central belt opening 90c would act to leave the central window 78 open, although that does not show in the particular cross section of FIG. 15. The flow through the central window 78 allows some air flow out through the central floor duct outlet 54, center floor duct 102, and to the rear passenger space. Again, if the multi zone capability were not needed, then the basic air flow shown in FIG. 15 would be the same, but the three temperature belts 74s and 74c would operate as one (or in fact, be one belt), and the splitter walls 98 and the widthwise divider wall 52 would be eliminated.

Modifications in the preferred embodiment disclosed could be made. The fundamental advantage of the invention as disclosed is the relative orientation of components, and especially the location of the temperature belt 74, that allows the upper downstream quadrant D to serve as the air mixing chamber, with the consequent compactness of the whole housing 30. As an alternative to the tipped, diagonal location shown, the heater 58 could be located almost in a horizontal orientation, but still all within the lower downstream quadrant C, and still with its first or upper face oriented generally toward the quadrant D. The air flow through heater 58 would still be the reverse of the normal flow, that is, up through the heater 58 and into quadrant D. In that alternative case, the two legs of the temperature belt(s) 74 would be oriented more in an L shaped than a V shaped configuration, but the upstream leg thereof would still act to separate the upstream (A,B) from the downstream (C,D) quadrants, and the downstream leg thereof would still act to cover the first, upper face of the heater 58. The diagonal orientation of the heater 58 does allow a wider core to fit within a give size quadrant C, however. As already noted, the splitter walls 98 and the separation of the temperature belt 74 into three separate, independently movable belts could be eliminated, if the individual air temperature selection capability were not desired. If a stiff enough temperature belt material could be found to be self supporting, then the support frames 60 and 62 could be eliminated. The frames 60 and 62 allow more flexible belt material to be used, however, as well as providing a convenient framework for the addition of the splitter walls 98. Different mode valves could potentially be used, in place of the mode belt 88. However, the particular L shaped mode belt 88 and supporting frame 62 shown, by virtue of the fact that they lie on the upper and rear border of the "D quadrant," diagonally opposed to the temperature belt(s) 74, cooperate uniquely with the V shaped temperature belt 74 to capture the air flows within the D quadrant before they exit to the selected outlets. Therefore, it should be understood that it is not intended to limit the invention just to the embodiment disclosed.

We claim:

1. An automotive heating, ventilation and air conditioning housing (30) that is generally divided into upper (B) and lower (A) upstream quadrants and upper (D) and lower (C) downstream quadrants as defined by the space envelope occupied by a larger, upstream evaporator (56) and a smaller, downstream heater (58) contained within said housing (30), with the evaporator (56) located across both upstream quadrants (A, B) and the heater (58) located substantially within just the lower downstream quadrant (C) with a first heater face oriented generally toward the upper downstream quadrant (D) and an opposed second heater face, characterised by, a temperature valve having a movable belt (74) arrayed with substantially equal length upstream and downstream legs, and oriented with the upstream leg dividing the upstream (A,B) and downstream (C,D) quadrants and with the downstream leg covering the first face of said heater (58), said belt (74) having an opening therein substantially equal in length to one belt leg length and movable back and forth between the two legs so as to selectively block or unblock air flow through said evaporator (56) while concurrently unblocking or blocking air flow through said heater (58) in inverse proportion, and, an air flow diversion passage (100) running from the bottom of the upstream lower quadrant (A) to the heater second face so as to divert a portion of the air that has passed through the evaporator (56) and direct the air so diverted in a reverse flow through the heater (58) and into the upper downstream quadrant (D), said air being diverted only to the extent that the evaporator (56) is blocked and the heater upper face is correspondingly unblocked by the position of the opening in the temperature valve belt (74), whereby air that has passed through the evaporator (56) and any diverted air that has passed through the heater (58) are both ultimately directed into the upper downstream quadrant (D) to be mixed.

2. An automotive heating, ventilation and air conditioning housing (30) according to claim 1, further characterized in that the heater (58) is oriented generally diagonally across the lower downstream quadrant (C), and the temperature valve belt (74) is oriented in a generally V shaped configuration.

3. An automotive heating, ventilation and air conditioning housing (30) according to claim 2, further characterized in that the temperature valve belt (74) is supported by a rigid support frame (60).

4. An automotive heating, ventilation and air conditioning housing (30) according to claim 3, further characterized in that a mode selection valve having a movable belt (88) arrayed in a general L shaped is diagonally opposed to the temperature belt (74).

* * * * *